US008731993B2

(12) United States Patent
Kuppusamy

(10) Patent No.: US 8,731,993 B2
(45) Date of Patent: May 20, 2014

(54) COMPILING IMAGES WITHIN A RESPONDENT INTERFACE USING LAYERS AND HIGHLIGHT FEATURES

(75) Inventor: Palanivel Kuppusamy, Plano, TX (US)

(73) Assignee: Ipinion, Inc., Plano, TX (US)

( * ) Notice: Subject to any disclaimer, the term of this patent is extended or adjusted under 35 U.S.C. 154(b) by 0 days.

(21) Appl. No.: 13/492,124

(22) Filed: Jun. 8, 2012

(65) Prior Publication Data

US 2013/0328920 A1    Dec. 12, 2013

(51) Int. Cl.
*G06Q 10/00* (2012.01)
(52) U.S. Cl.
USPC ........................................................ 705/7.29
(58) Field of Classification Search
USPC ........................................................ 705/7.29
See application file for complete search history.

(56) References Cited

U.S. PATENT DOCUMENTS

| | | | |
|---|---|---|---|
| 2002/0052774 A1 | 5/2002 | Parker et al. | |
| 2006/0045312 A1* | 3/2006 | Bernstein et al. | 382/103 |
| 2008/0097769 A1* | 4/2008 | Galvin et al. | 705/1 |
| 2011/0238476 A1* | 9/2011 | Carr et al. | 705/14.25 |
| 2012/0246004 A1* | 9/2012 | Book et al. | 705/14.58 |

OTHER PUBLICATIONS

International Search Report and Written Opinion issued for PCT/US2013/045017, dated Jun. 27, 2013, 9 pages.

* cited by examiner

*Primary Examiner* — Romain Jeanty
(74) *Attorney, Agent, or Firm* — Fulbright & Jaworski LLP

(57) ABSTRACT

An apparatus for compiling images within a respondent interface includes a survey datastore recording surveys including one or more test images. A rendering engine accesses the survey datastore and displays the one or more test images with controls for at least one respondent to provide feedback about the one or more test images during at least two modes of operation. A respondent feedback object instantiation engine detects respondent interaction with a touch screen displaying the one or more test images during first and second modes of operation, and records results of the respondent interaction in a feedback datastore by feedback types according to the first and second modes of operation.

30 Claims, 12 Drawing Sheets

Selected Question: [Featured: Image Creative/Layers] You will be asked to create a design with four layers. Each layer has four images to choose from. Please choose one image per layer and complete the design. ⟵ 1604

No. of responses: 42

| Combo | Layers ⟵ 1602 | |
|---|---|---|
| Selected Image | Responses For This Selection | Percentage ⟵ 1700 |
| [image] | 5 | 11.90% |
| [image] | 3 | 7.14% |

COMPILING IMAGES WITHIN A RESPONDENT INTERFACE USING LAYERS AND HIGHLIGHT FEATURES

CROSS-REFERENCE TO RELATED APPLICATIONS

This patent application is related to commonly assigned, co-pending U.S. patent application Ser. No. 13/492,147, filed Jun. 8, 2012 and entitled Utilizing Heat Maps to Represent Respondent Sentiments, the disclosure of which is incorporated herein by reference in its entirety.

TECHNICAL FIELD

This disclosure is generally directed to a system and method for administering surveys and obtaining survey results. This disclosure is specifically directed to a system and method for compiling images within a respondent interface using layers and highlight features.

BACKGROUND

Market research is an organized effort to gather information about markets or customers. Market research can include social and opinion research performed to systematically gather and interpret information about individuals or organizations using statistical and analytical methods and techniques of the applied social sciences to gain insight or support decision making. Viewed as an important component of business strategy, market research can be a key factor to obtain advantage over competitors. Market research provides important information to identify and analyze market need, market size, and competition.

The advent of mobile devices, such as smart phones, presents new opportunities for enlisting mobile device users as respondents in performing market research. However, the limited touch screen interfaces of such mobile devices presents new challenges for interfacing with respondents in performing market research surveys. Accordingly, new challenges have arisen regarding obtaining and meaningfully representing results of such research.

BRIEF SUMMARY

In some aspects, an apparatus for compiling images within a respondent interface includes a survey datastore recording surveys including one or more test images. A rendering engine accesses the survey datastore and displays the one or more test images with controls for at least one respondent to provide feedback about the one or more test images during at least two modes of operation. A respondent feedback object instantiation engine detects respondent interaction with a touch screen displaying the one or more test images during first and second modes of operation, and records results of the respondent interaction in a feedback datastore by feedback types according to the first and second modes of operation.

In other aspects, a method of compiling images within a respondent interface includes accessing, by a computer processor, a survey datastore recording surveys including one or more test images. The one or more test images are displayed with controls for at least one respondent to provide feedback about the one or more test images during at least two modes of operation. Respondent interaction with a touch screen displaying the one or more test images is detected during first and second modes of operation. Results of the respondent interaction are recorded in a feedback datastore by feedback types according to the first and second modes of operation.

In further aspects, a computer program product for compiling images within a respondent interface includes a non-transitory computer-readable medium having program code recorded thereon. The program code includes program code to access, by a computer processor, a survey datastore recording surveys including one or more test images, and program code to display the one or more test images with controls for at least one respondent to provide feedback about the one or more test images during at least two modes of operation. The program code additionally includes program code to detect respondent interaction with a touch screen displaying the one or more test images during first and second modes of operation, and program code to record results of the respondent interaction in a feedback datastore by feedback types according to the first and second modes of operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying FIGURES, in which:

FIG. 17 is a graphical representation illustrating combination specific feedback results display in accordance with the present disclosure.

DETAILED DESCRIPTION

By way of overview, techniques and methods are disclosed for compiling images within a respondent interface using layers and highlight features. Mobile device users are empowered to provide feedback about one or more test images in two or more modes of operation. For example, in one type of survey, respondents may select a hue of highlight to designate the mode of operation, and express preferences, such as like and dislike, with respect to image regions. The positive feedback and negative feedback may be recorded separately, and expressed to marketing research customers by compiling the feedback according to type and generating separate heat maps for each type of feedback. Additionally, another type of survey may present respondents with multiple test images for selection to define a layer of a composite test image. The respondent selections for each layer may be recorded separately, and expressed to marketing research customers by compiling the feedback according to type and generating data regarding respondent selections of the test images in defining the layers of the composite test images. Popularity of individual layers may be reported, as may popularity of individual combinations.

Figure 1:
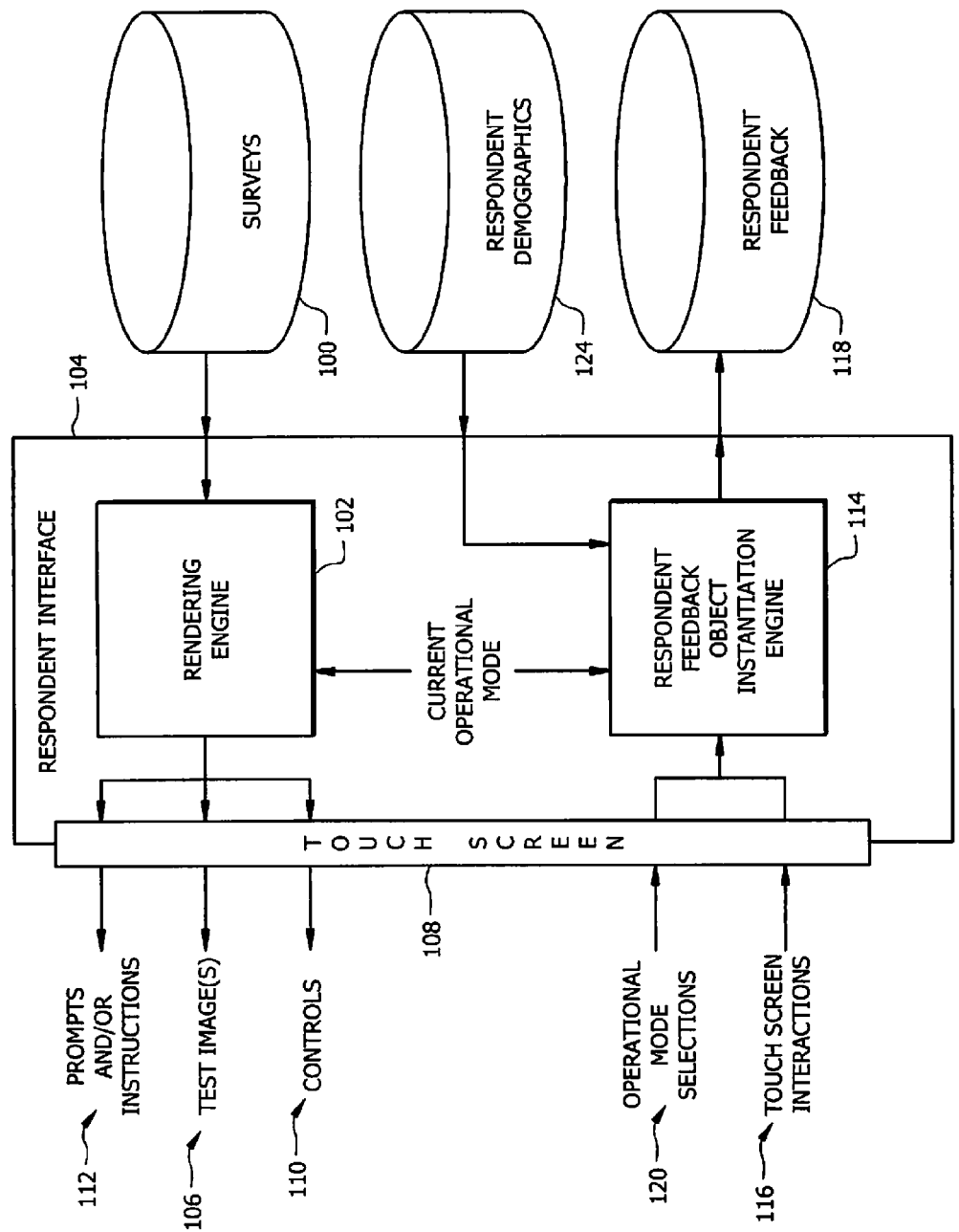
FIG. 1 is a block diagram illustrating a system for compiling images within a respondent interface using layers and highlight features in accordance with the present disclosure.

FIG. 1 illustrates a system for compiling images within a respondent interface using layers and highlight features in accordance with the present disclosure. A survey datastore has recorded therein surveys including one or more test images. For example, a survey may be designed to prompt a respondent to highlight regions of a test image with hues designated to express like and dislike in different modes of operation. In this case, the different modes of operation correspond to using one hue to express like and another to express dislike. In alternative or additional embodiments, a survey may be designed to prompt a respondent to construct a composite test image made up of combinations of the one or more test images presented as layers in different modes of operation. In this case, the different modes of operation correspond to selecting from one subset of test images to define one layer of the composite test image, and selecting from another subset of test images to define another layer of the composite test image.

A rendering engine 102 of respondent interface 104 may access the survey datastore 100 and displays the one or more test images 106 on a touch screen 108. Rendering engine 102 displays test images 106 together with controls 110 for respondents to provide feedback about the one or more test images during two or more modes of operation, and prompts and/or instructions 112 to elicit the respondent feedback. A respondent feedback object instantiation engine 114 may detect respondent interaction 116 with the touch screen 108 displaying the one or more test 106 images during the first and second modes of operation, and record results of the respondent interaction 116 in a feedback datastore 118 by feedback types according to the first and second modes of operation. In some embodiments, controls 110 may permit the respondent to make operational mode selections 120. In additional or alternative embodiments, the operational modes may be sequenced, and the respondent may not control navigation between the operational modes. Engine 102 and engine 114 may interact to ensure that the current operational mode is known to engines 102 and 114, thus permitting proper administration of the survey by rendering engine 102, and proper categorization of respondent feedback in feedback datastore 118. In some embodiments, engine 114 may obtain respondent demographics information, and record results of the respondent interaction in the feedback datastore by the respondent demographics. In some of these embodiments, engine 114 may obtain the respondent demographics information by accessing a demographics datastore 124 and retrieving the demographics information for the respondent. Examples of survey administration by the respondent interface 104 are described in greater detail below with respect to FIGS. 3-5 and 8-14.

Figure 2:
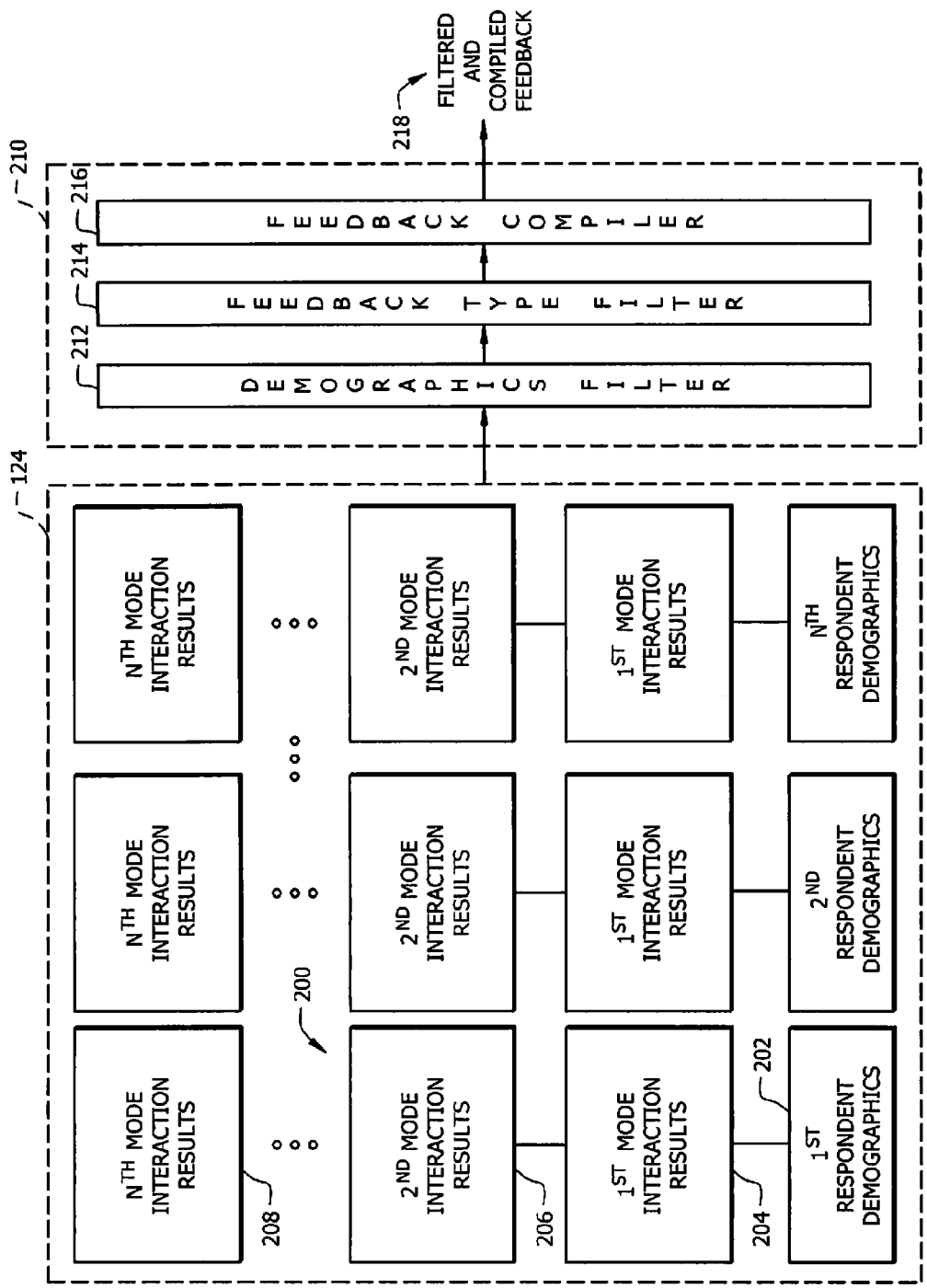
FIG. 2 is a block diagram illustrating a back end of the system of FIG. 1.

FIG. 2 illustrates a back end of the system. The feedback datastore 124 may have stored therein a plurality of respondent data objects 200. Each data object 200 may be a matrix separately storing respondent demographics 202, interaction results during a first mode of operation 204, interaction results during a second mode of operation 206, and interaction results during an $N^{th}$ mode of operation 208. It should be understood that there may be reserved memory locations for feedback provided by respondents in each mode of operation, but that some of these locations may be null if, for example, a respondent chose not to provide any feedback during certain of the modes of operation. The system backend 210 may have a plurality of filters, such as a demographics filter 212 and a feedback type filter 214, that permit a marketing research customer to retrieve from feedback datastore 124 the objects 200 that match specified demographics, and optionally filter out certain categories of feedback types. A feedback compilation engine 216 may compile the filtered feedback according to the feedback types, and present filtered and compiled feedback 218. Examples of such filtered and compiled feedback 218 are described in greater detail below with respect to FIGS. 7, 16, and 17, whereas examples of data objects 200 are described in greater detail below with respect to FIGS. 6 and 15.

Figure 3:
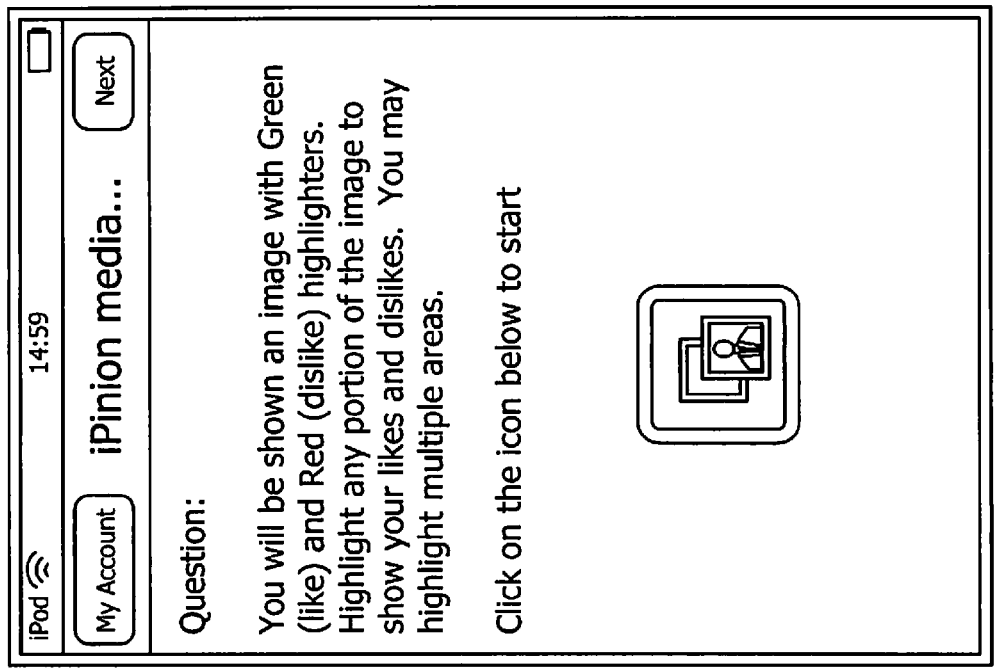
FIG. 3 is a graphical representation illustration prompt generation for a survey eliciting respondent feedback in the form of highlight layers in accordance with the present disclosure.

FIG. 3 illustrates prompt generation for a survey eliciting respondent feedback in the form of highlight layers in accordance with the present disclosure. The prompt may contain instructions informing the respondent that test images with green and red highlighters will be shown, and that the green highlight may be used to express likes, while the red highlight may be used to express dislike. The prompt may additionally inform the user that multiple areas of the test images may be marked.

Figure 4:
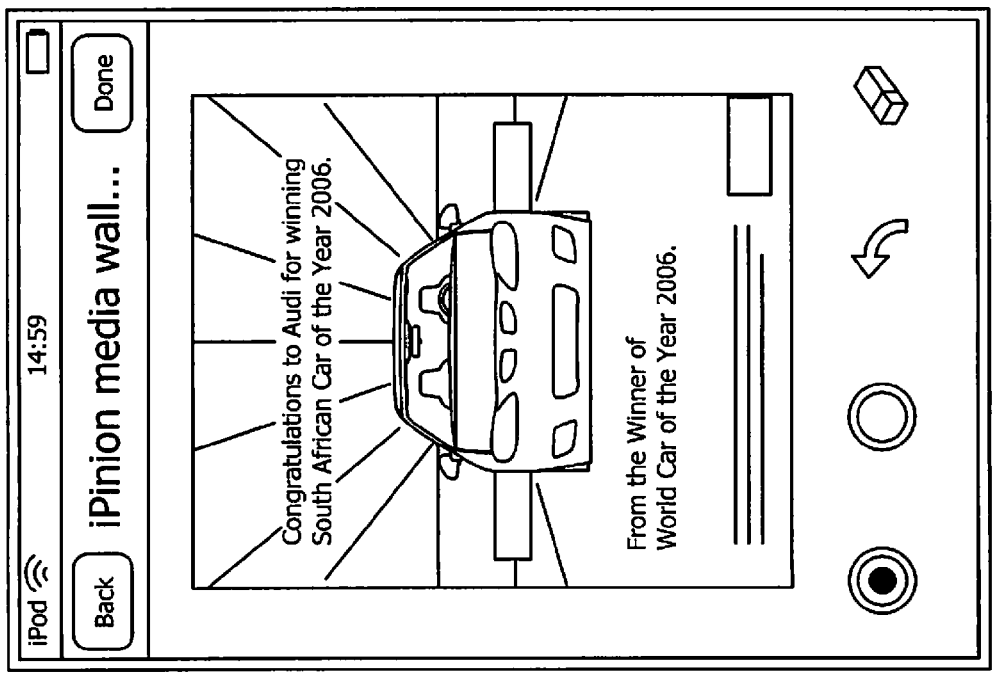
FIG. 4 is a graphical representation illustration display of a test image and operational mode controls for a survey eliciting respondent feedback in the form of highlight layers in accordance with the present disclosure.
Figure 5:
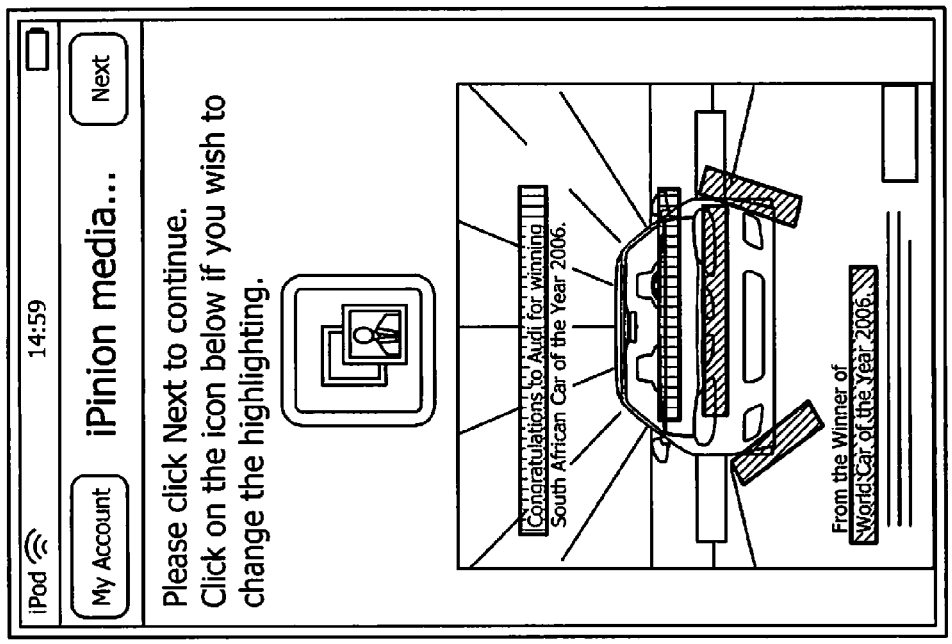
FIG. 5 is a graphical representation illustration display of the test image and highlight layers obtained by administrating a survey eliciting respondent feedback in the form of highlight layers in accordance with the present disclosure.

FIG. 4 illustrates display of a test image 400 and operational mode controls 402 for a survey eliciting respondent feedback in the form of highlight layers in accordance with the present disclosure. The controls 402 may include red and green highlight buttons that permit the respondent to navigate between the two operational modes. As shown in FIG. 5, in one mode, red and green highlight is added in layers over the test image at locations where the respondent touches the touch screen, and these highlight layers may be displayed to the respondent. In other words, controls 402 may navigate between at least two modes of operation by designating a hue of highlight to utilize in highlighting regions of one or more test images. The controls 402 shown in FIG. 4 may also include an eraser tool permitting deletion of highlight by touching the touch screen at a region where the highlight is displayed overlaying the test image. It should be understood that red and green highlight may be stored in separate layers.

Figure 6:
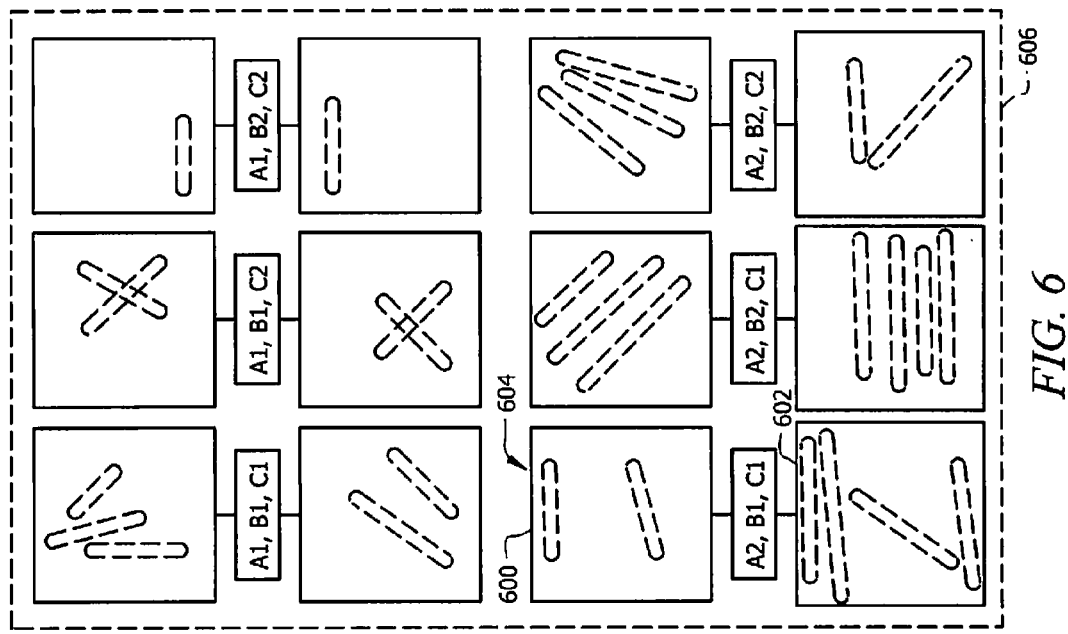
FIG. 6 is a block diagram illustrating storage of highlight layers in respondent feedback data objects in a feedback datastore in accordance with the present disclosure.

FIG. 6 illustrates storage of highlight layers 600 and 602 in respondent feedback data objects 604 in a feedback datastore 606 in accordance with the present disclosure. Each object 604 may store feedback for a single respondent in a matrix including respondent demographics 606, the positive feedback layer 600, and the negative feedback layer 602. In some embodiments, the layers 600 and 602 may be the highlight layers that were created by the respondent. In other embodiments, the layers 600 and 602 may be reduced or compressed representations of the highlight layers created by the respondent. In still other embodiments, the layers 600 and 602 may be motion vectors recording the respondent interaction resulting in the creation of the highlight layers.

Figure 7:
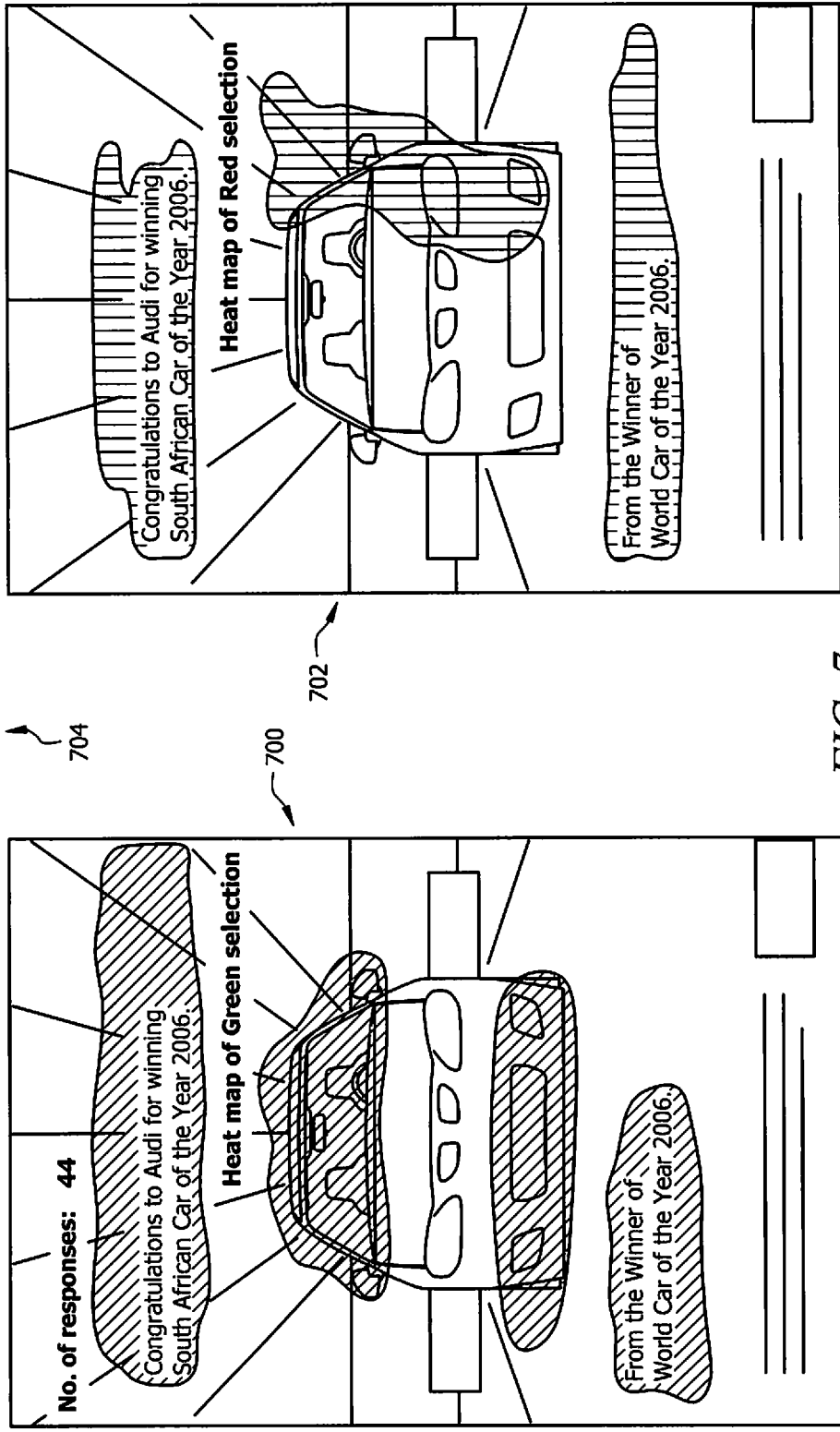
FIG. 7 is a graphical representation illustrating heat map generation in accordance with the present disclosure.

FIG. 7 illustrates heat map generation in accordance with the present disclosure. In some embodiments, the backend of the respondent interface graphically renders the respondent feedback as a feedback type specific heat map overlaying at least one of the one or more test images. In some embodiments, a positive feedback heat map 700 may be displayed simultaneously side by side with a negative feedback heat map 702. In some embodiments, the prompt 704 that was displayed to the respondent to elicit the respondent interaction may also be displayed. Additional details regarding heat map generation are described in a related, commonly assigned, co-pending U.S. patent application Ser. No. 13/492,147, filed Jun. 8, 2012 and entitled Utilizing Heat Maps to Represent Respondent Sentiments, the disclosure of which is incorporated by reference herein in its entirety.

Figure 8:
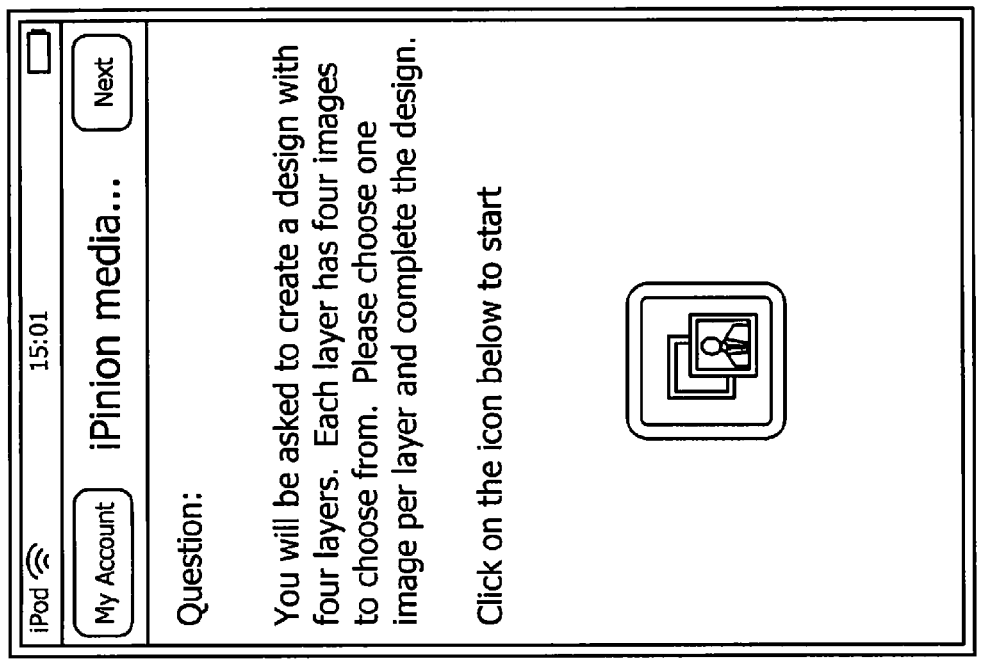
FIG. 8 is a graphical representation illustration prompt generation for a survey eliciting respondent feedback in the form of composite image layer selections in accordance with the present disclosure.

FIG. 8 illustrates prompt generation for a survey eliciting respondent feedback in the form of composite image layer selections in accordance with the present disclosure. The prompt may include instructions to the respondent indicating that the respondent will be asked to create a design with a number (e.g., four) of layers, and that each layer has a number (e.g., four) of images to choose from. The instructions may also indicate that the respondent should choose one image from each layer and complete the design.

Figure 9:
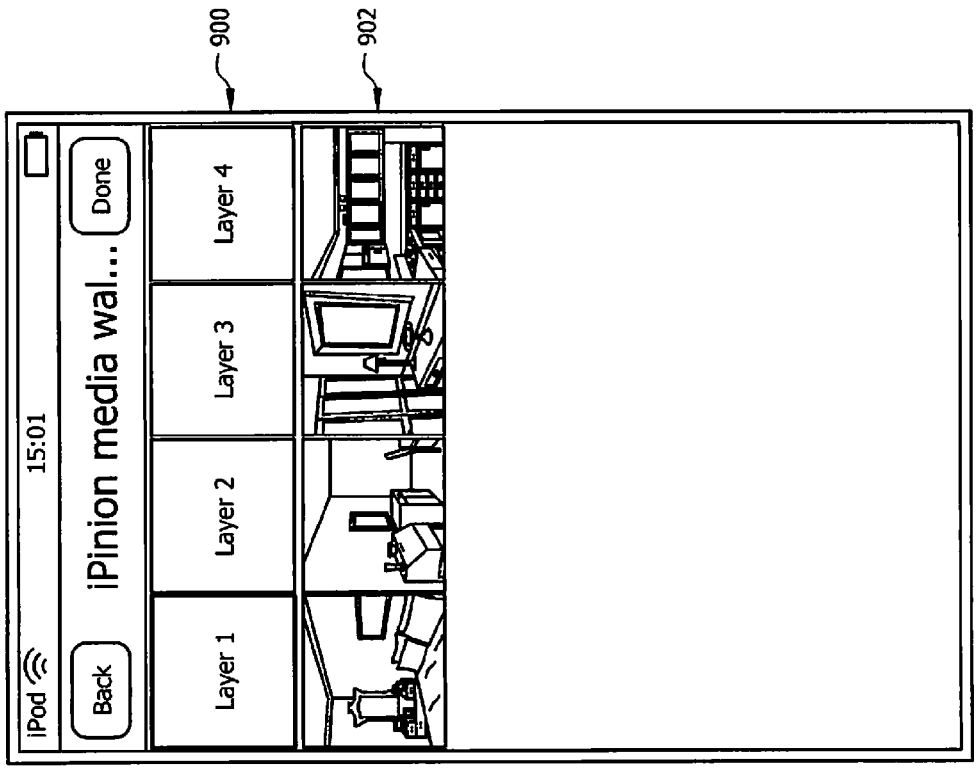
FIG. 9 is a graphical representation illustrating display of operational mode controls and test images selectable for a background layer of a composite image during a first mode of operation in accordance with the present disclosure.

FIG. 9 illustrates display of operational mode controls 900 and controls 902 for selecting a background layer of a composite image during a first mode of operation in accordance with the present disclosure. In some embodiments, controls 902 correspond to thumbnails of the test images selectable for the background layer. In some embodiments, a respondent may interact with controls 900 to navigate between layers, and thus designate the current operational mode. In other words, controls 900 navigate between two or more modes of operation by designating a layer of a composite test image to be defined by respondent selection of a test image of the one or more test images. In other embodiments, the controls 900 may not be interactive, but rather labels to indicate the current mode to the respondent. In these embodiments, the navigation to the next layer may occur upon respondent selection of one of images 902. Both of these types of embodiments include the display of images 902 as controls for selecting one of the one or more test images to serve as a layer of a composite test image.

Figure 11:
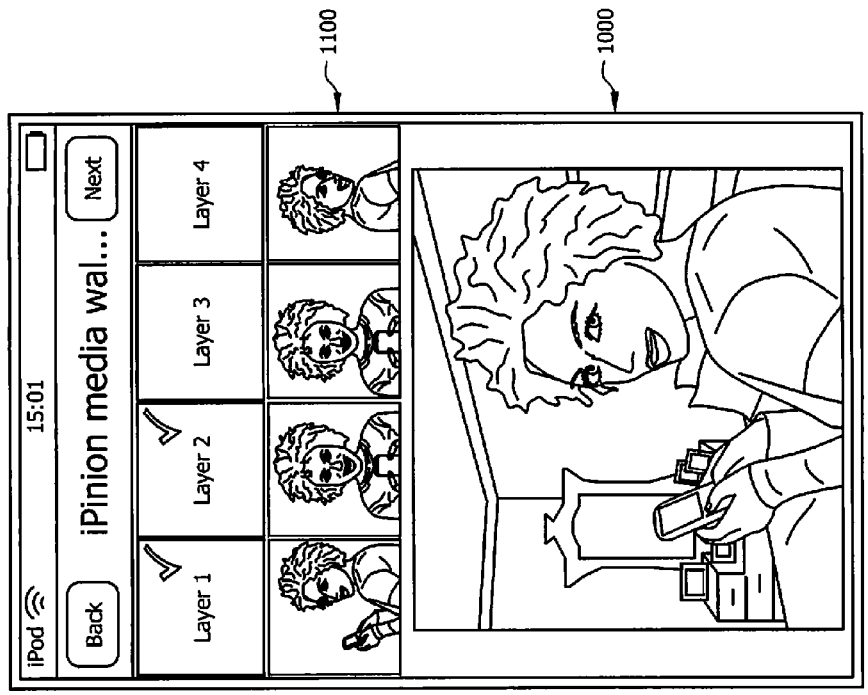
FIG. 11 is a graphical representation illustrating display of operational mode controls and test images selectable for a second layer of the composite image during a second mode of operation in accordance with the present disclosure.
Figure 10:
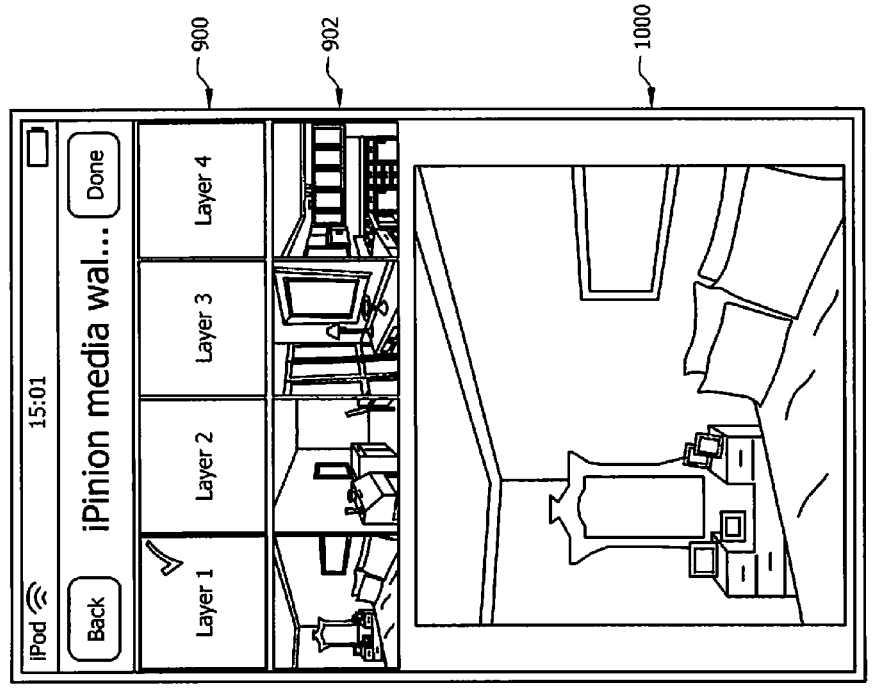
FIG. 10 is a graphical representation illustrating results of user selection of one of the test images selectable for the background layer of the composite image during the first mode of operation in accordance with the present disclosure.

FIG. 10 illustrates results of user interaction with controls 902 to accomplish selection of one of the test images selectable for the background layer of the composite image during the first mode of operation in accordance with the present disclosure. The test image selected by the respondent may be displayed at regular size in a display region 1000 for showing the partially completed composite test image. In some embodiments, a display property (e.g., checkmark icon) of the controls 900 may change to indicate that a test image has been selected for the first layer. Then, interaction of the respondent with a second one of the controls 900 may cause controls 902 to change into controls 1100 that display thumbnails of another subset of test images selectable for the second layer as shown in FIG. 11. Interaction by the respondent with controls 1100 may then cause display in region 1000 of the selected test image in a foreground layer over the previously selected background image. Again, a display property (e.g., checkmark icon) of the controls 900 may change to indicate that a test image has been selected for the second layer.

Figure 13:
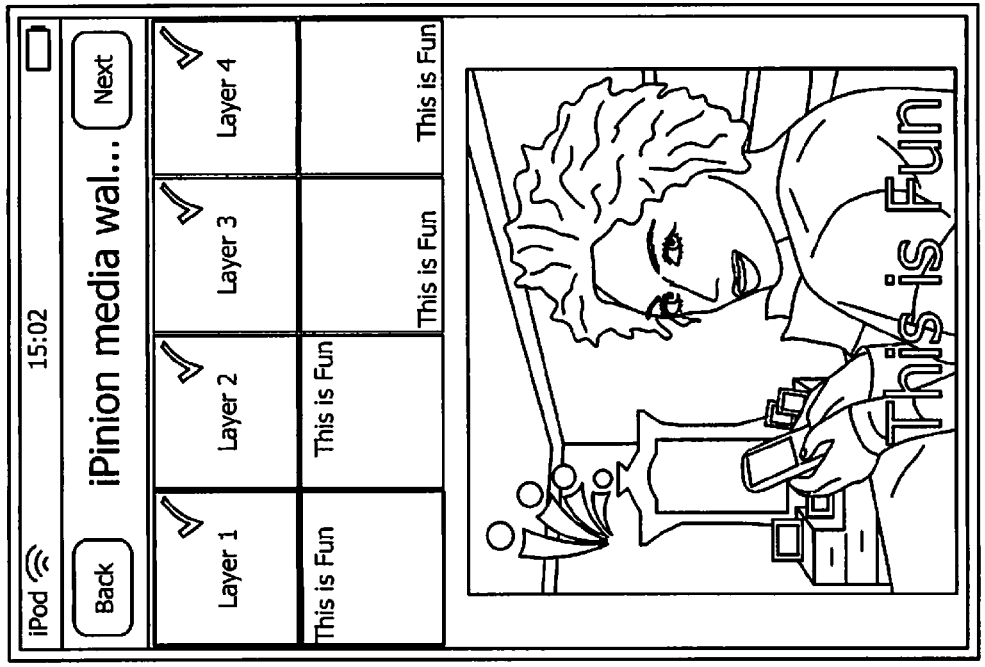
FIG. 13 is a graphical representation illustrating display of operational mode controls and test images selectable for a fourth layer of the composite image during a fourth mode of operation in accordance with the present disclosure.
Figure 12:
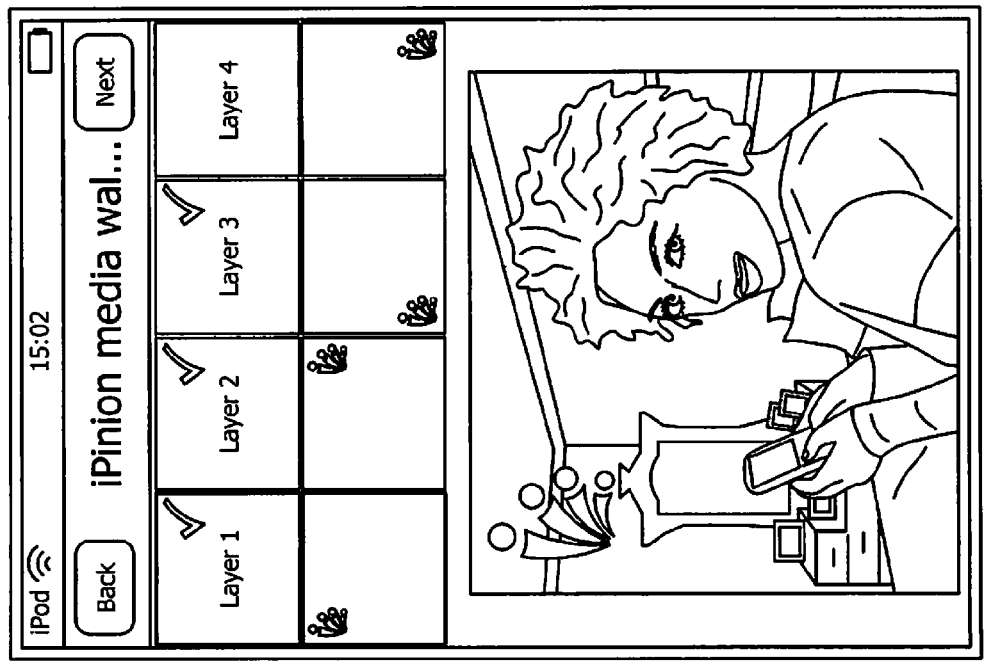
FIG. 12 is a graphical representation illustrating display of operational mode controls and test images selectable for a third layer of the composite image during a third mode of operation in accordance with the present disclosure.

FIGS. 12 and 13 illustrate display of operational mode controls and test images selectable for third and fourth layers of the composite test image during third and fourth modes of operation in accordance with the present disclosure. Upon completion of selections, the respondent may be presented with a display, shown in FIG. 14, of the completed composite test image in region 1000. Controls with corresponding instructions may also be provided instructing the respondent of options to change selections or continue. Upon completion, the respondent selections and demographics may be stored in a data object.

Figures 14, 15:
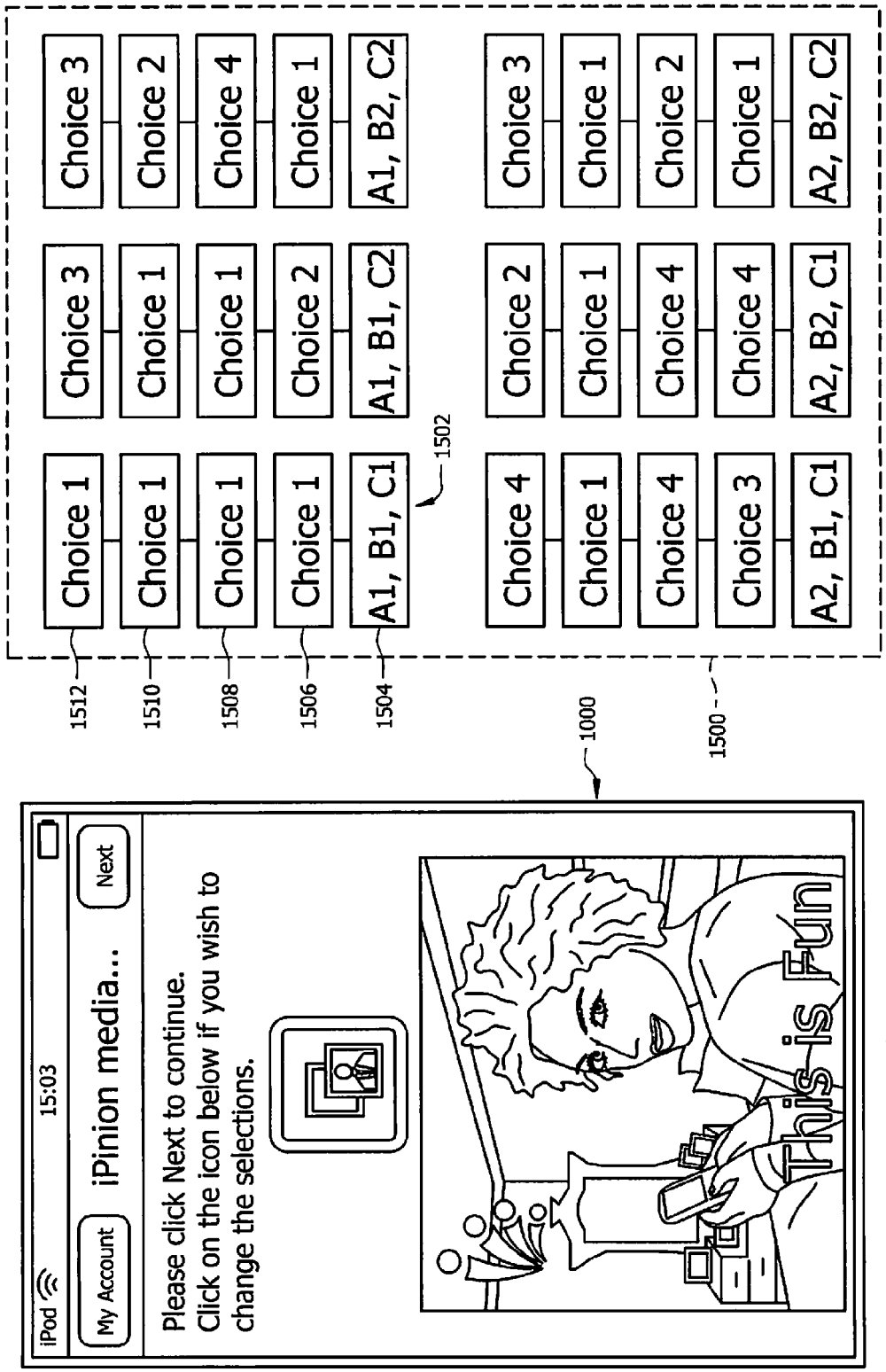
FIG. 14 is a graphical representation illustrating display of an operational mode control and the composite test image reflecting the combination of respondent selections in accordance with the present disclosure.
FIG. 15 is a block diagram illustrating storage of combinations of respondent selections in respondent feedback data objects in a feedback datastore in accordance with the present disclosure.

FIG. 15 illustrates storage of combinations of respondent selections in respondent feedback data objects 1500 in a feedback datastore 1502 in accordance with the present disclosure. Each object 1500 may store feedback for a single respondent in a matrix including respondent demographics 1504, the respondent's selection 1506 for the first layer, the respondent's selection 1508 for the second layer, the respondent's selection 1510 for the third layer, and the respondent's selection 1512 for the fourth layer. In some embodiments, the layers 1506-1512 may be the test images or thumbnails that were selected by the respondent. In other embodiments, the layers 1506-1512 may be designations of the selections made by the respondent.

Figure 16:
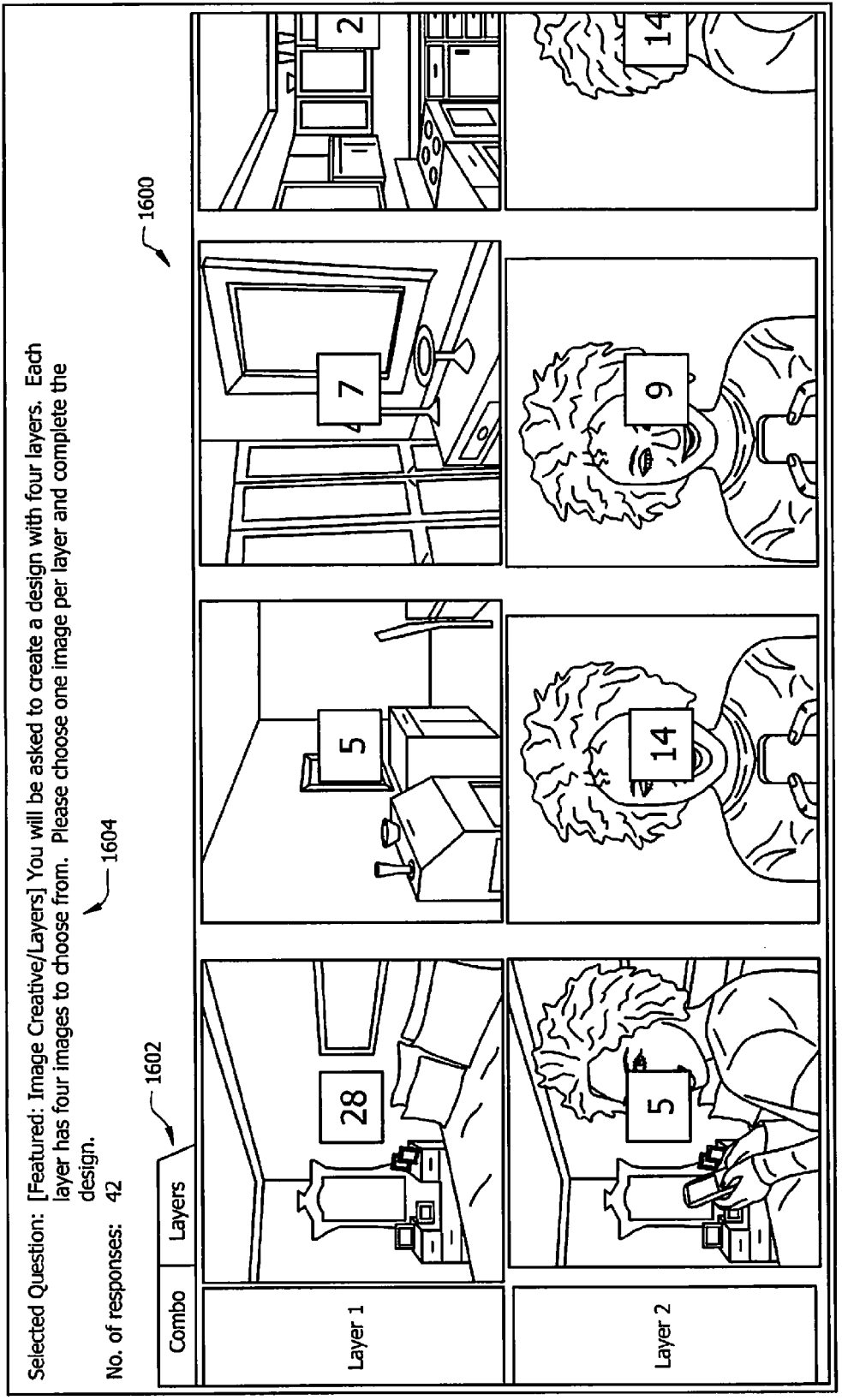
FIG. 16 is a graphical representation illustrating layer specific feedback results display in accordance with the present disclosure.

FIG. 16 illustrates layer specific feedback results display in accordance with the present disclosure. In this example, the backend of the respondent interface graphically renders the respondent feedback as data regarding respondent selections of the one or more test images in constructing composite test images made up of combinations of the one or more test images. The popularity of individual ones of the one or more test images may be indicated, for example, in a table 1600 displaying the test images, and the number or proportion of respondents selecting that test image. The interface of the backend may have tabs or other controls 1602 for navigating between data output types. The prompt 1604 that was displayed to the respondent to elicit the interaction may also be displayed.

FIG. 17 illustrates combination specific feedback results display in accordance with the present disclosure. In this example, the backend of the respondent interface graphically renders the respondent feedback as data regarding respondent selections of the one or more test images in constructing composite test images made up of combinations of the one or more test images. The popularity of individual ones of the combinations selected by respondents may be indicated, for example, in a table 1700 displaying the composite test images, and the number or proportion of respondents selecting that combination of test images. Again, the interface of the backend may have tabs or other controls 1602 for navigating between data output types, and the prompt 1604 that was displayed to the respondent to elicit the interaction may also be displayed.

Figure 18:
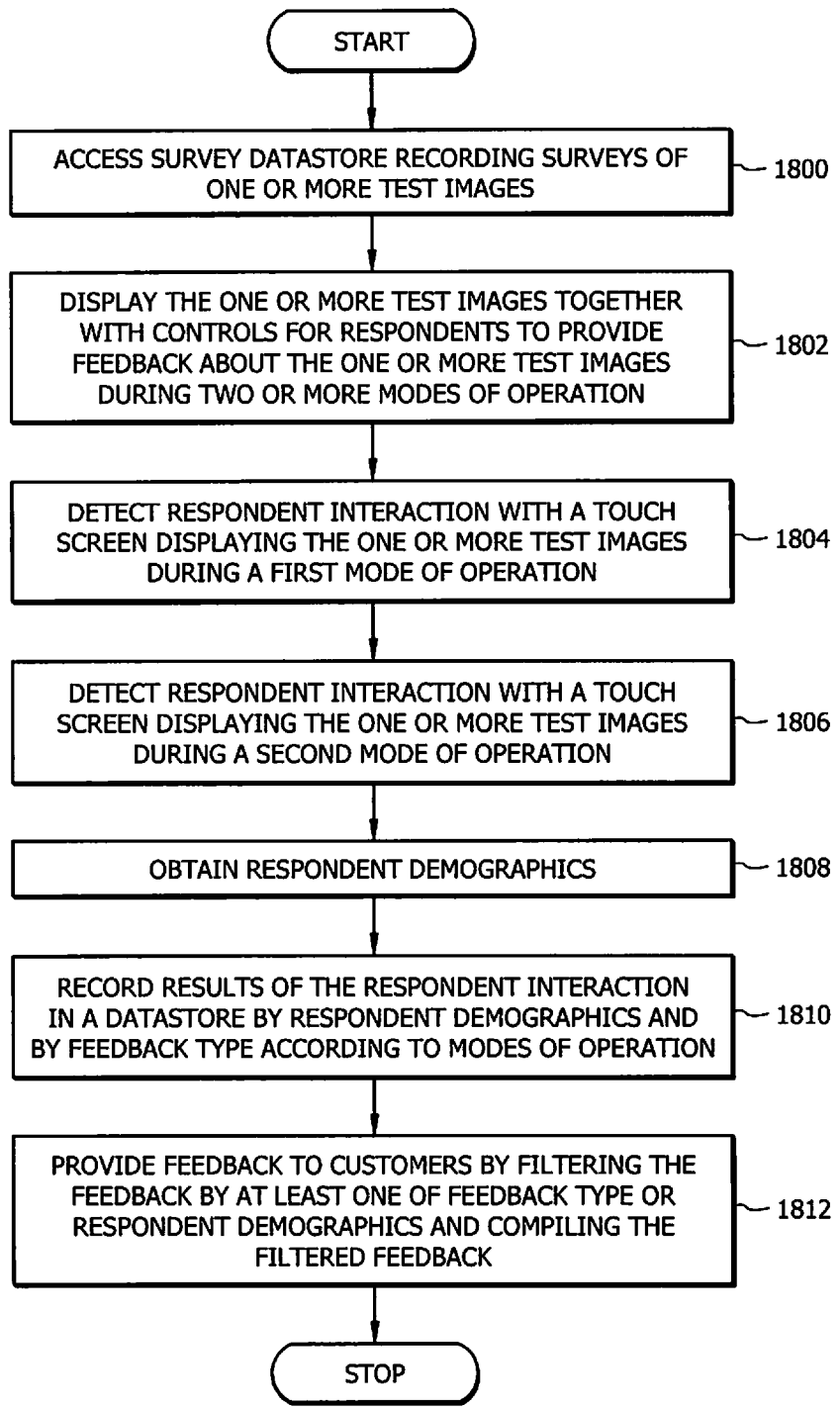
FIG. 18 is a flow diagram illustrating a method of compiling images within a respondent interface using layers and highlight features in accordance with the present disclosure.

FIG. 18 illustrates a method of compiling images within a respondent interface using layers and highlight features in accordance with the present disclosure. At step 1800, a computer processor may access a survey datastore recording surveys including one or more test images. At step 1802, the computer processor may display the one or more test images with controls for at least one respondent to provide feedback about the one or more test images during at least two modes of operation. At step 1804, the computer processor may detect respondent interaction with a touch screen displaying the one or more test images during a first mode of operation. At step 1806, the computer processor may detect respondent interaction with the touch screen displaying the one or more test images during a second mode of operation. At step 1808, the computer processor may obtain respondent demographics. At step 1810, the computer processor may record results of the respondent interaction in a feedback datastore by the respondent demographics, and by feedback types according to the first and second modes of operation. At step 1812, the computer processor may provide feedback to marketing research customers by filtering the feedback by the demographics and/or feedback type, and compiling the filtered feedback according to the feedback types.

As previously described, in some embodiments, step 1812 includes graphically rendering the respondent feedback as a feedback type specific heat map overlaying at least one of the one or more test images. In additional embodiments, step 1812 includes graphically rendering the respondent feedback as data regarding respondent selections of the one or more test images in constructing composite test images made up of combinations of the one or more test images. In some embodiments, the data indicates at least one of popularity of individual ones of the combinations or popularity of individual ones of the one or more test images.

As previously described, in some embodiments, step 1802 includes displaying controls that navigate between the at least two modes of operation by designating a hue of highlight to utilize in highlighting regions of the one or more test images. In additional embodiments, step 1802 includes displaying controls that navigate between the at least two modes of operation by designating a layer of a composite test image to be defined by respondent selection of a test image of the one or more test images. In some embodiments, step 1802 includes displaying controls for selecting one of the one or more test images to serve as a layer of a composite test image. In additional or alternative embodiments, step 1802 includes displaying a prompt to the respondent for initiating the respondent interaction.

The functional blocks and modules in FIGS. 1, 2, 6, and 15 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for compiling images within a respondent interface, comprising:
   at least one processor; and
   a memory coupled to the at least one processor, wherein the at least one processor is configured to:
   record surveys including one or more test images;
   access a survey datastore and display the one or more test images with controls for at least one respondent to provide feedback about the one or more test images during at least two modes of operation; and
   detect respondent interaction with a touch screen displaying the one or more test images during first and second modes of operation, and record results of the respondent interaction in a feedback datastore by feedback types according to the first and second modes of operation.

2. The apparatus of claim 1, wherein the at least one processor is further configured to:
   access a feedback datastore and compile the respondent feedback according to the feedback types.

3. The apparatus of claim 2, wherein the at least one processor is further configured to:
   render the respondent feedback as a feedback type specific heat map overlaying at least one of the one or more test images.

4. The apparatus of claim 2, wherein the at least one processor is further configured to:
   render the respondent feedback as data regarding respondent selections of the one or more test images in constructing composite test images made up of combinations of the one or more test images.

5. The apparatus of claim 4, wherein the data indicates at least one of popularity of individual ones of the combinations or popularity of individual ones of the one or more test images.

6. The apparatus of claim 1, wherein the at least one processor is further configured to:
   obtain respondent demographics and record results of the respondent interaction in a feedback datastore by the respondent demographics.

7. The apparatus of claim 1, wherein the controls include controls that navigate between the at least two modes of operation by designating a hue of highlight to utilize in highlighting regions of the one or more test images.

8. The apparatus of claim 1, wherein the controls include controls that navigate between the at least two modes of operation by designating a layer of a composite test image to be defined by respondent selection of a test image of the one or more test images.

9. The apparatus of claim 1, wherein the controls include controls for selecting one of the one or more test images to serve as a layer of a composite test image.

10. The apparatus of claim 1, wherein the at least one processor is further configured to:
    display a prompt to the respondent for initiating the respondent interaction.

11. A method of compiling images within a respondent interface, comprising:
    accessing, by a computer processor, a survey datastore recording surveys including one or more test images;
    displaying the one or more test images with controls for at least one respondent to provide feedback about the one or more test images during at least two modes of operation;
    detecting respondent interaction with a touch screen displaying the one or more test images during a first mode of operation;
    detecting respondent interaction with the touch screen displaying the one or more test images during a second mode of operation; and
    recording results of the respondent interaction in a feedback datastore by feedback types according to the first and second modes of operation.

12. The method of claim 11, further comprising:
    at a backend of the respondent interface, accessing the datastore of respondent feedback; and
    compiling the respondent feedback according to the feedback types.

13. The method of claim 12, further comprising:
    graphically rendering the respondent feedback as a feedback type specific heat map overlaying at least one of the one or more test images.

14. The method of claim 12, further comprising:
    graphically rendering the respondent feedback as data regarding respondent selections of the one or more test images in constructing composite test images made up of combinations of the one or more test images.

15. The method of claim 14, wherein the data indicates at least one of popularity of individual ones of the combinations or popularity of individual ones of the one or more test images.

16. The method of claim 11, further comprising:
obtaining respondent demographics; and
recording results of the respondent interaction in the feedback datastore by the respondent demographics.

17. The method of claim 11, wherein the controls include controls that navigate between the at least two modes of operation by designating a hue of highlight to utilize in highlighting regions of the one or more test images.

18. The method of claim 11, wherein the controls include controls that navigate between the at least two modes of operation by designating a layer of a composite test image to be defined by respondent selection of a test image of the one or more test images.

19. The method of claim 11, wherein the controls include controls for selecting one of the one or more test images to serve as a layer of a composite test image.

20. The method of claim 11, further comprising:
displaying a prompt to the respondent for initiating the respondent interaction.

21. A computer program product for compiling images within a respondent interface, comprising:
a non-transitory computer-readable medium having program code recorded thereon, the program code including:
program code to access, by a computer processor, a survey datastore recording surveys including one or more test images;
program code to display the one or more test images with controls for at least one respondent to provide feedback about the one or more test images during at least two modes of operation;
program code to detect respondent interaction with a touch screen displaying the one or more test images during a first mode of operation;
program code to detect respondent interaction with the touch screen displaying the one or more test images during a second mode of operation; and
program code to record results of the respondent interaction in a feedback datastore by feedback types according to the first and second modes of operation.

22. The computer program product of claim 21, wherein the computer readable medium further comprises:
program code to, at a backend of the respondent interface, access the datastore of respondent feedback ; and
program code to compile the respondent feedback according to the feedback types.

23. The computer program product of claim 22, wherein the computer readable medium further comprises:
program code to graphically render the respondent feedback as a feedback type specific heat map overlaying at least one of the one or more test images.

24. The computer program product of claim 22, wherein the computer readable medium further comprises:
program code to graphically render the respondent feedback as data regarding respondent selections of the one or more test images in constructing composite test images made up of combinations of the one or more test images.

25. The computer program product of claim 24, wherein the data indicates at least one of popularity of individual ones of the combinations or popularity of individual ones of the one or more test images.

26. The computer program product of claim 21, wherein the computer readable medium further comprises:
program code to obtain respondent demographics; and
program code to record results of the respondent interaction in the feedback datastore by the respondent demographics.

27. The computer program product of claim 21, wherein the controls include controls that navigate between the at least two modes of operation by designating a hue of highlight to utilize in highlighting regions of the one or more test images.

28. The computer program product of claim 21, wherein the controls include controls that navigate between the at least two modes of operation by designating a layer of a composite test image to be defined by respondent selection of a test image of the one or more test images.

29. The computer program product of claim 21, wherein the controls include controls for selecting one of the one or more test images to serve as a layer of a composite test image.

30. The computer program product of claim 21, wherein the computer readable medium further comprises:
program code to display a prompt to the respondent for initiating the respondent interaction.

* * * * *